United States Patent [19]
Dewald

[11] Patent Number: 5,930,050
[45] Date of Patent: Jul. 27, 1999

[54] ANAMORPHIC LENS FOR PROVIDING WIDE-SCREEN IMAGES GENERATED BY A SPATIAL LIGHT MODULATOR

[75] Inventor: Duane S. Dewald, Dallas, Tex.

[73] Assignee: Texas Instruments Incorporated, Dallas, Tex.

[21] Appl. No.: 09/153,991

[22] Filed: Sep. 16, 1998

Related U.S. Application Data

[60] Provisional application No. 60/062,872, Oct. 21, 1997.

[51] Int. Cl.$^6$ .......................... G02B 13/12; G02B 13/08; G02B 26/08; G02F 1/00
[52] U.S. Cl. .......................... 359/670; 359/668; 359/671; 359/207; 348/756
[58] Field of Search .................... 348/556, 913, 348/739, 756, 781, 785; 359/207, 668–671

[56] References Cited

U.S. PATENT DOCUMENTS

| | | | |
|---|---|---|---|
| 2,531,399 | 11/1950 | Cawein et al. | 349/781 |
| 2,752,821 | 7/1956 | Cook | 359/668 |
| 2,924,145 | 2/1960 | Landeau | 359/668 |
| 2,944,464 | 7/1960 | Rosin | 359/671 |
| 3,565,511 | 2/1971 | Dilworth | 359/668 |
| 3,644,037 | 2/1972 | Larraburu | 359/668 |
| 3,658,410 | 4/1972 | Willey | 359/671 |
| 3,751,136 | 8/1973 | Kirchhoff | 359/670 |
| 3,924,933 | 12/1975 | Hirose | 359/670 |
| 3,932,702 | 1/1976 | Shelley et al. | 348/781 |
| 3,990,785 | 11/1976 | Hirose | 359/670 |
| 4,805,998 | 2/1989 | Chen et al. | 359/670 |
| 5,028,939 | 7/1991 | Hornbeck et al. | 347/131 |
| 5,079,544 | 1/1992 | DeMond et al. | 345/84 |
| 5,184,223 | 2/1993 | Mihara | 359/668 |
| 5,184,880 | 2/1993 | Lisziewicz | 359/668 |
| 5,191,474 | 3/1993 | Suzuki et al. | 359/668 |
| 5,260,831 | 11/1993 | Suzuki et al. | 359/668 |
| 5,339,193 | 8/1994 | Korpert et al. | 359/668 |
| 5,386,252 | 1/1995 | Oku | 348/746 |
| 5,452,024 | 9/1995 | Sampsell | 348/755 |
| 5,499,061 | 3/1996 | Oku | 348/746 |
| 5,504,514 | 4/1996 | Nelson | 347/130 |
| 5,526,051 | 6/1996 | Gove et al. | 348/388 |
| 5,579,064 | 11/1996 | Vetter | 352/38 |
| 5,671,093 | 9/1997 | Jung et al. | 359/668 |
| 5,673,086 | 9/1997 | Fukuoka et al. | 348/445 |
| 5,796,442 | 8/1998 | Gove et al. | 348/556 |
| 5,796,526 | 8/1998 | Anderson | 359/671 |

*Primary Examiner*—Georgia Epps
*Assistant Examiner*—Evelyn A. Lester
*Attorney, Agent, or Firm*—Charles A. Brill; Frederick J. Telecky, Jr.; Richard L. Donaldson

[57] ABSTRACT

An anamorphic lens (11) for use in a display system (10) that has a spatial light modulator (12) and a projection lens (13) and that projects images to a screen (14). The anamorphic lens (11) is placed between the projection lens (13) and the screen (14). The spatial light modulator (12) generates an image that is anamorphically squeezed in the horizontal dimension, and the anamorphic lens (11) widens the image so that the viewer perceives a normal wide-screen image on the screen (14).

9 Claims, 3 Drawing Sheets

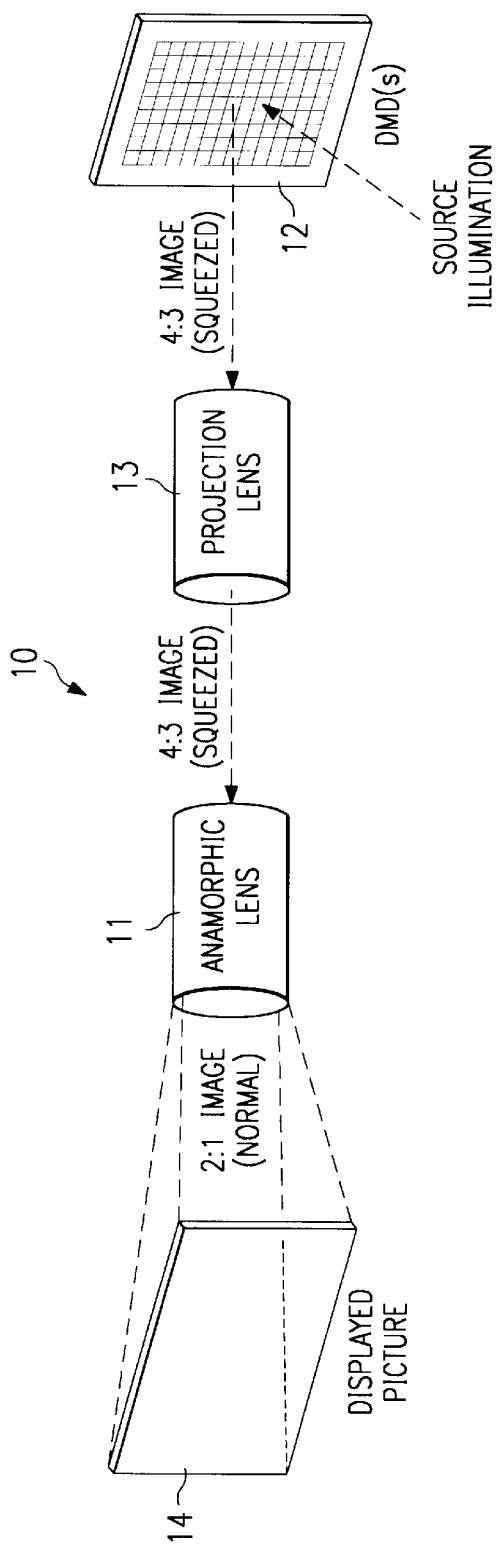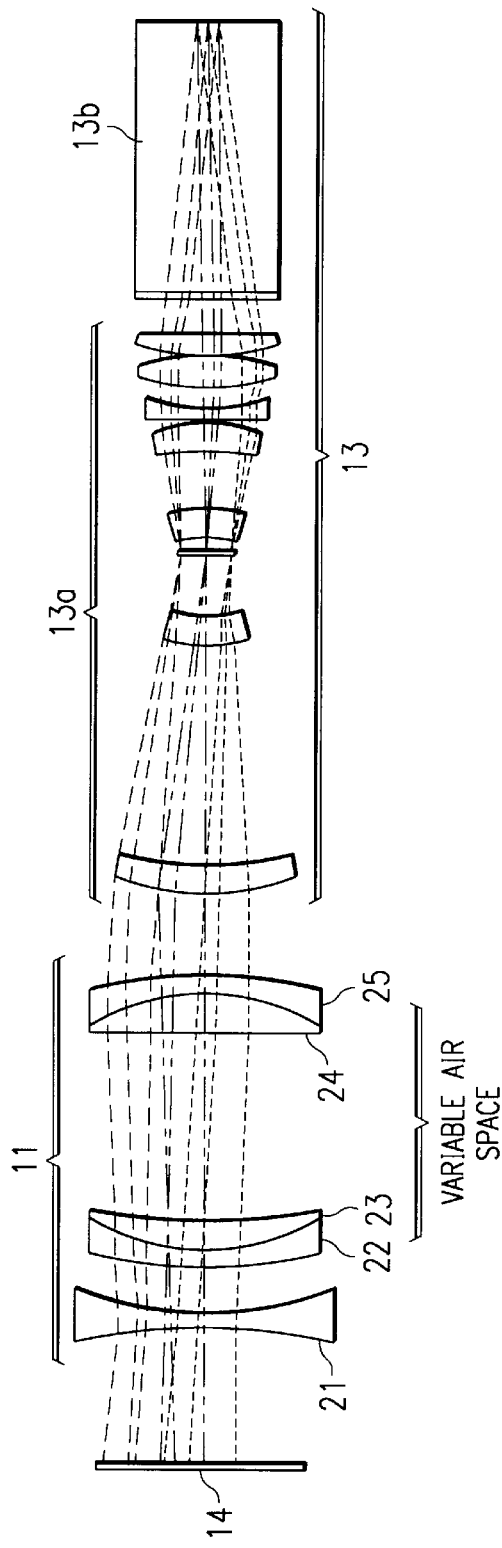

| SURFTYPE | RADIUS | THICKNESS | GLASS | DIAMETER |
|---|---|---|---|---|
| TOROIDAL | −245 | 5 | K5 | 104 |
| TOROIDAL | 119.5 | 16.26764 |  | 104 |
| TOROIDAL | 145 | 7.5 | K5 | 96 |
| TOROIDAL | 79.6 | 13 | SF2 | 96 |
| TOROIDAL | 230.5 | 69.59376 |  | 96 |
| TOROIDAL | INFINITY | 15 | BK7 | 84 |
| TOROIDAL | −78 | 8 | SF2 | 84 |
| TOROIDAL | −151 | 100 |  | 84 |

ANAMORPHIC LENS FOR PROVIDING WIDE-SCREEN IMAGES GENERATED BY A SPATIAL LIGHT MODULATOR

This application claims priority under 35 U.S.C. §119 (e) (1) of provisional application Ser. No. 60/062,872 filed Oct. 21, 1997.

TECHNICAL FIELD OF THE INVENTION

This invention relates to optical devices used in spatial light modulator display systems, and more particularly to an anamorphic lens that resizes the image to a wider aspect ratio that of the spatial light modulator.

BACKGROUND OF THE INVENTION

One type of display system is a projection display system, where a projection lens is used to project the image to a screen. Movie theaters are one example of such display systems on a large scale. More recently, television sets and digital cinema systems have been developed that also use projection lenses. The projection lens may be for either front or rear projection, depending on whether the lens is on the viewer side of the screen or behind the screen.

Spatial light modulators (SLMs) are a type of display device that may use a projection lens. In general, SLMs are arrays of pixel-generating elements that emit or reflect light to the display screen via the projection lens. The SLM modulates light by turning the pixel-generating elements on or off.

An example of an SLM is a DMD (digital micro-mirror device). A DMD is an electromechanical device, whose pixel-generating elements form an array hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Incident light on the mirror array is reflected by the "on" mirrors in one direction and by the "off" mirrors in the other direction. The pattern of "on" versus "off" mirrors forms an image. In most applications, the light from the DMD is projected by a projection lens to a screen.

The size of the array of an SLM's pixel-generating elements determines the aspect ratio of the image it generates. For example, an SLM might have an array size of 1024×768, thereby generating images with an aspect ratio of 4:3. This 4:3 aspect ratio is consistent with NTSC television broadcast signals as well as those used for personal computer displays.

As display systems become more advanced, the variety of source data that they are capable of displaying has increased. Each type of source data may have its own format, that is, its own aspect ratio and vertical and horizontal resolution. For example, one advance is the availability of "digital cinema", in which movie films are digitized for display. Movie films are characterized by a wide aspect ratio, such as 2:1. Another advance is high definition television with wide aspect ratios, such as the 16:9 format.

The obvious approach to using an SLM to display images having a desired aspect ratio is to use an SLM that has the same aspect ratio. Thus, a 2:1 image would be displayed with a 2:1 SLM. However, this approach requires a different SLM to be manufactured for each format having a different aspect ratio.

Another approach is to use an SLM that has a different aspect ratio but to forego use of the entire array. An example of this approach is the "letterbox" display, where a movie image is displayed with blank bands at the top and bottom. However, this approach is inefficient and the picture is distracting.

A third approach is to use an anamorphic lens to stretch the image to fit the desired aspect ratio. However, a problem with existing anamorphic lenses is that they are designed for a particular projection lens and are not likely to operate with a different projection lens. Also, existing anamorphic lenses are designed for large scale projectors where compactness and cost considerations are not overriding considerations.

SUMMARY OF THE INVENTION

One aspect of the invention is an anamorphic lens for use in a display system having a spatial light modulator for generating images and a projection lens for projecting the image to a screen. The spatial light modulator has an associated aspect ratio, which need not match the aspect ratio of the images to be displayed, and generates an image that is "squeezed" in one dimension. The anamorphic lens has a series of lens elements in the optical path between screen and the projector. The first lens element is a bi-concave lens. A second lens element is spaced from the first lens element and has a first surface that is convex. A third lens element also has a first surface that is convex, and the second lens and third lens form a doublet. A fourth lens element is spaced from the third lens element, thereby forming an air space, and has a first surface that is planar. A fifth lens element has a first surface that is concave, and the fourth lens and the fifth lens also form a doublet. The anamorphic lens is operable to "unsqueeze" the image to fill one dimension of a desired aspect ratio.

An advantage of the invention is it that permits a single SLM to be used for a variety of display formats.

For example, a 4:3 SLM can be used to display 2:1 movie films. The picture quality of the anamorphically stretched image is comparable to that produced by conventional movie projection lenses.

The anamorphic lens can have a particular optical prescription (lens radii, glass type, etc) that is adjustable for use with different projection lenses. Specifically, a particular prescription has been tested to useful with projection lenses having throw ratios in a range of 7:1 down to 3:1.

Furthermore, the same basic five-element lens configuration can be used with SLMs having different aspect ratios. For example, the same basic configuration has been implemented in a 1.5:1 form for use with both 4:3 and 5:4 SLMs to provide 2:1 and 1.85:1 images, respectively.

In sum, the invention provides a versatile, low cost, compact, and efficient solution to the problem of displaying wide images on SLMs.

BRIEF DESCRIPTION OF THE DRAWINGS

FIG. 1 illustrates a portion of a projection display system that has an anamorphic lens in accordance with the invention.

FIGS. 2 and 3 are a top view and isometric view, respectively, of the anamorphic lens of FIG. 1.

DETAILED DESCRIPTION OF THE INVENTION

The following description is directed to an anamorphic lens that is used with a display system that uses at least one SLM to generate the image. In general, the invention recognizes that the image can be "squeezed" when generated by the SLM and then optically widened to provide wide-screen images, such as those associated with movie films. The anamorphic lens permits the entire SLM array to be active. Thus, the same SLM can be used to display both "television" and movie images without loss of picture size and light efficiency.

FIG. 1 illustrates a portion of a typical display system 10, with which the anamorphic lens 11 may be used. An SLM 12 generates an image, which is projected by a projection lens 13 through the anamorphic lens 11 to the screen 14. Thus, anamorphic lens 11 is in the optical path between projection lens 13 and the screen 14.

As stated in the Background, SLM 12 has an associated aspect ratio. In the example of FIG. 1, the aspect ratio of SLM 12 is 4:3. The anamorphic lens 11 has an aspect ratio modification ratio, which in the example of FIG. 1, is 1.5:1. As a result, the displayed image has an aspect ratio of 2:1. However, the invention is not limited to a 4:3 display device. Nor is it limited to a lens 11 with a modification ratio of 1.5:1.

SLM 12 is assumed to be capable of generating an image that is "squeezed" in the horizontal dimension, that is, an image that requires an anamorphic lens in order to look normal. The squeezed image could be the result of the manner in which the source image is recorded or it could be the result of some sort of processing within the display system 10. The amount that the image is squeezed substantially corresponds to the modification factor of the lens 11. Thus, in the example of FIG. 1, the 4:3 image generated by SLM 12 is squeezed in the horizontal dimension by a factor of 1.5.

DMD's, a type of SLM, are especially suited for use with anamorphic lens 11. Examples of DMD-based display systems, without the anamorphic lens of the present invention, are described in U.S. Pat. No. 5,079,544, entitled "Standard Independent Digitized Video System," in U.S. patent Ser. No. 08/147,249 now U.S. Pat. No. 5,526,051, entitled "Digital Television System," and in U.S. patent Ser. No. 08/146,385 now U.S. Pat. No. 5,452,024, entitled "DMD Display System". U.S. patent Ser. No. 08/333,200 now U.S. Pat. No. 5,796,442, entitled "A Multi-Format Television Architecture", describes various processing techniques associated with displaying different formats with the same DMD. Each of these inventions is assigned to Texas Instruments Incorporated, and each is incorporated by referenced herein.

In the example of FIG. 1, a single SLM 12 generates the image, and can provide full-color images by means of a color wheel (not shown). However, as explained below in connection with FIG. 2, an alternative method of providing color images is to use multiple DMD's and combine their images optically.

Figure 3:
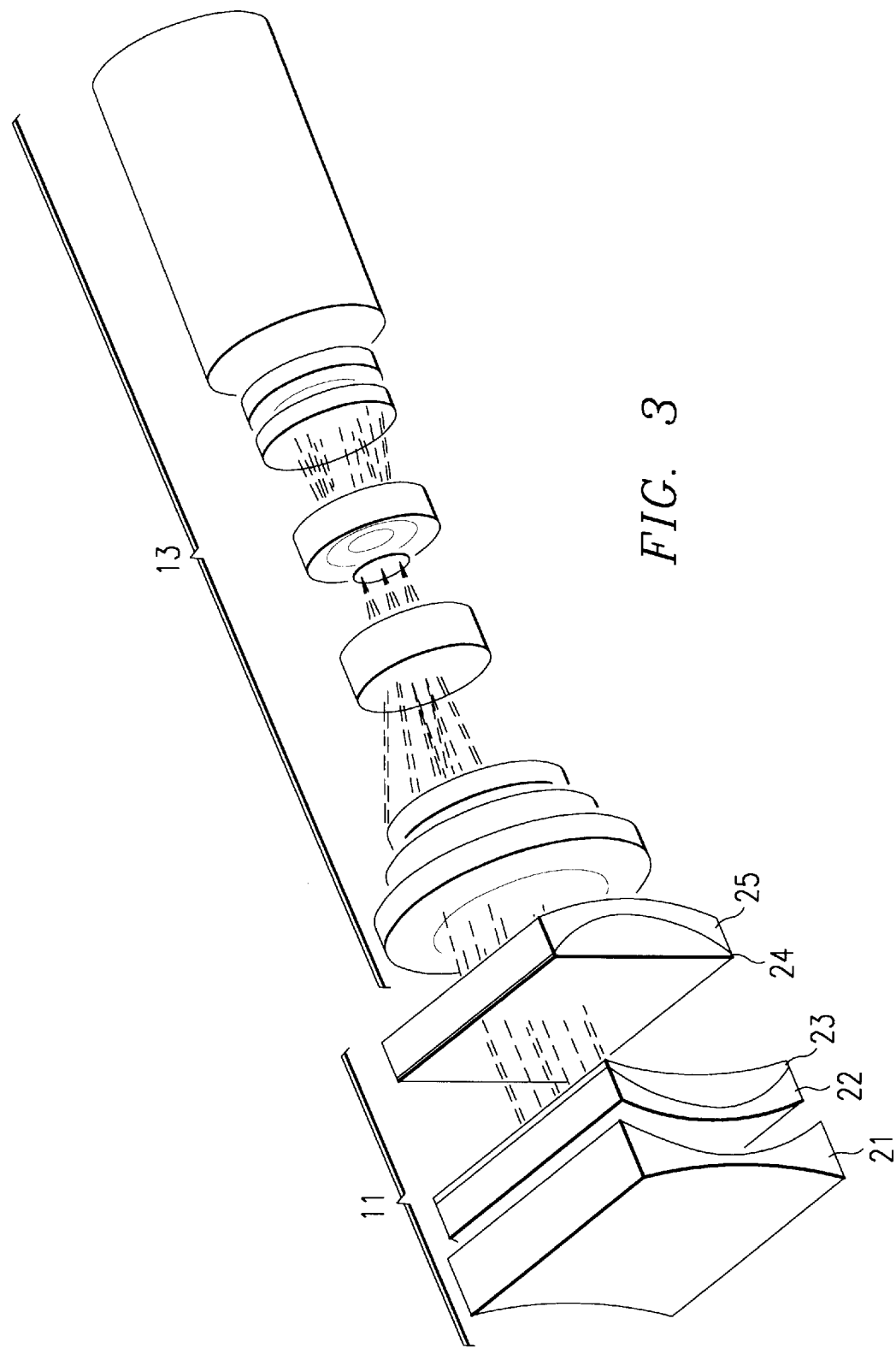

FIGS. 2 and 3 are a top view and an isometric view, respectively, of an anamorphic lens 11 in accordance with the invention. It is placed in front of a projection lens 13, which has a primary lens 13a and prism 13b. The image is displayed on screen 14.

Primary lens 13a puts the image on screen 14 at a desired throw ratio. For example, if primary lens 13a has a 7:1 throw ratio, a viewer 35 feet from the lens would see a 5 foot wide picture. The throw ratio associated with projection lens 13a is changed when anamorphic lens 11 is used. In the example of this description, where anamorphic lens 11 has a modification ratio of 1.5:1, the throw ratio is reduced by a factor of 1.5.

Prism 13b is used with a display system having three spatial light modulators, which each concurrently generate a different color of the same image, red, green, or blue. Prism lens 13b combines the three images to provide a single full-color image. For a display system that uses a single spatial light modulator 12, such as system 10 of FIG. 1, prism lens 13b would not be used.

Anamorphic lens 11 is comprised of a series of five cylindrical lens elements 21–25. Elements 22 and 23 comprise a doublet, as do elements 24 and 25. The use of doublet elements is a feature that reduces light loss within the display system and increases the contrast ratio of the displayed image. In fact, lens 11 has been experimentally determined to have a transmission ratio of 96%.

Element 21 is a cylindrical bi-concave lens. Elements 22 and 23 are a "meniscus", that is, a combination of convex and concave surfaces, as are elements 24 and 25.

Figures 4, 5:
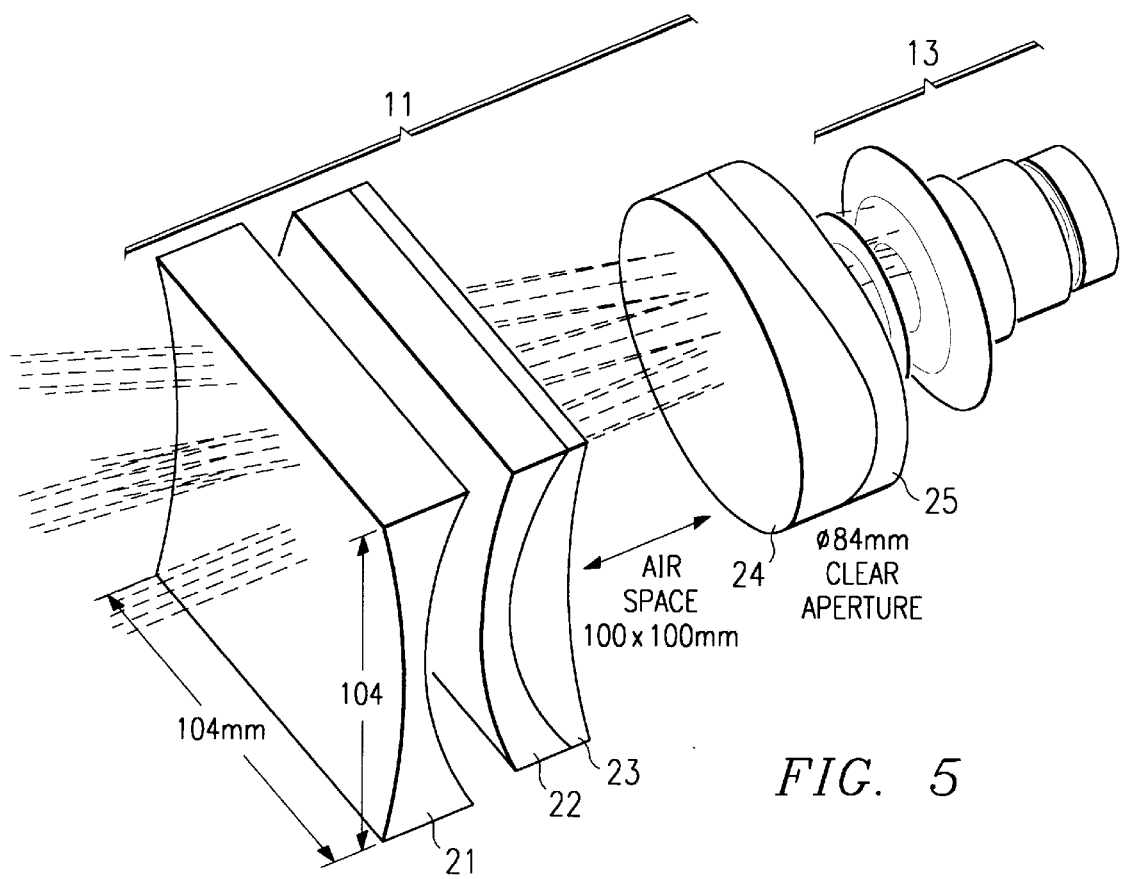
FIG. 4 is a table that sets out the optical characteristics of the anamorphic lens of FIG. 1.
FIG. 5 is another example of the anamorphic lens of FIG. 1.

FIG. 4 is a table that sets out the lens characteristics for the 1.5:1 embodiment of this description. Each of the surfaces is listed, and each surface corresponds to a surface in FIGS. 2 and 3, from left to right. The surface type "toroidal" is a generic classification that includes the cylindrical surface type of lens elements 21–25. The various dimensions are in millimeters.

As indicated in FIG. 4, there are a number of surfaces, with an air space between elements 21 and 22 and between elements 23 and 24. The "diameter" parameter is for purposes of example and primarily affects the size of the image to be displayed.

The extent to which anamorphic lens 11 modifies the aspect of the image it receives (herein referred to as its aspect modification ratio) is determined by a number of factors. These include the radius, thickness, and type of glass of each element of lens 11. Thus, the same configuration of lens elements 21–25 could be modified so as to have a different optical prescription thereby providing other modification ratios.

The air space between lenses 23 and 24 varies from approximately 64 to 72 millimeters. Adjustment of this air space permits the displayed image to be focussed in the horizontal dimension. In typical practice, the image from projection lens 13 is first focussed without anamorphic lens 11. The image will be focussed in both dimensions but squeezed in the horizontal dimension. Then, lens 11 is placed in the optical path. The image focus in the vertical dimension will not be affected, but by varying the air space, the focus in the horizontal dimension is adjusted and the image is stretched ("unsqueezed") horizontally.

The adjustability of the air space permits the same prescription of lens 11 to be used with a variety of projection lenses 13. By changing the distance of the variable air space, lens 11 can be focussed to accommodate a particular projection lenses 13. For example, it has been experimentally determined that the projection lens throw ratio may vary anywhere from 10:1 to 3:1.

A further feature of the invention is that the same prescription can be used for SLMs having different aspect ratios. For example, a 1.5:1 lens 11 has been satisfactorily tested with both a 4:3 and a 5:4 DMD, providing 2:1 and 1.85: images, respectively.

FIG. 5 is another example of lens 11, for a projection lens 13 having a different throw ratio than that of FIG. 3. FIG. 5 further illustrates that one or more elements of lens 11 may be round as well as square. Here, elements 24 and 25 are round. This design choice is a function of the size of the image to be displayed. The dimensions of each element are also illustrated. The optical prescription is the same except for an adjustment of the air space between elements 23 and 24. Thus, as stated above, the same lens 11 can provide the same modification ratio to an image projected by a different projection lens.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An anamorphic lens for use in a display system having a spatial light modulator for generating images and a projection lens for projecting the image to a screen, said spatial light modulator having an associated aspect ratio, and said screen and said projection lens having an optical path between them, comprising:
    a series of lens elements in an optical path between the screen and the projection lens, said series being:
    a first lens element that is a bi-concave lens;
    a second lens element spaced from said first lens element and having a first surface that is convex;
    a third lens element having a first surface that is convex, wherein said second lens and said third lens form a doublet;
    a fourth lens element spaced from said third lens element, thereby forming an air space, and having a first surface that is planar; and
    a fifth lens element having a first surface that is concave, wherein said fourth lens and said fifth lens form a doublet.

2. The anamorphic lens of claim 1, wherein said spatial light modulator has a 4:3 aspect ratio.

3. The anamorphic lens of claim 1, wherein said spatial light modulator has a 5:4 aspect ratio.

4. The anamorphic lens of claim 1, wherein said anamorphic lens modifies said aspect ratio of said spatial light modulator by 1.5:1.

5. The anamorphic lens of claim 1, wherein said air space between said third lens element and said fourth lens element may be adjusted to accommodate said projection lens having a throw ratio substantially in the range of 7:1 to 3:1.

6. A method of displaying a wide-screen image with a display system having a spatial light modulator for generating the image and a projection lens for projecting the image to a screen, said spatial light modulator having an associated aspect ratio, and said screen and said projection lens having an optical path between them, comprising:
    providing a series of lens elements in an optical path between the screen and the projection lens, said series being:
    a first lens element that is a bi-concave lens;
    a second lens element spaced from said first lens element and having a first surface that is convex;
    a third lens element having a first surface that is convex, wherein said second lens and said third lens form a meniscus;
    a fourth lens spaced from said third lens element, thereby forming an air space, and having a first surface that is planar; and
    a fifth lens having a first surface that is concave, wherein said fourth lens and said fifth lens form a meniscus; and
    adjusting said air space between said third lens and said fourth lens.

7. The anamorphic lens of claim 6, wherein said spatial light modulator has a 4:3 aspect ratio.

8. The anamorphic lens of claim 6, wherein said spatial light modulator has a 5:4 aspect ratio.

9. The anamorphic lens of claim 6, wherein said anamorphic lens modifies said aspect-ratio of said spatial light modulator by 1.5:1.

* * * * *